United States Patent
Mizuno et al.

(10) Patent No.: US 9,494,230 B2
(45) Date of Patent: Nov. 15, 2016

(54) CONTROL UNIT OF AUTOMATIC TRANSMISSION

(71) Applicant: DENSO CORPORATION, Kariya, Aichi-pref. (JP)

(72) Inventors: Yuta Mizuno, Kariya (JP); Fuminori Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/926,040

(22) Filed: Oct. 29, 2015

(65) Prior Publication Data

US 2016/0131248 A1   May 12, 2016

(30) Foreign Application Priority Data

Nov. 6, 2014 (JP) ................................. 2014-226227

(51) Int. Cl.
*F16H 61/00* (2006.01)
*F16H 61/02* (2006.01)

(52) U.S. Cl.
CPC ...... *F16H 61/0021* (2013.01); *F16H 61/0202* (2013.01)

(58) Field of Classification Search
None
See application file for complete search history.

(56) References Cited

U.S. PATENT DOCUMENTS

| 5,773,981 A | * | 6/1998 | Sugiura | F16H 61/12 324/415 |
| 7,935,025 B1 | * | 5/2011 | Lee | B60W 10/06 477/115 |
| 2010/0163360 A1 | * | 7/2010 | Fujii | F16H 61/0021 192/3.33 |
| 2013/0041563 A1 | * | 2/2013 | Komiya | F16H 61/0021 701/60 |
| 2014/0254058 A1 | * | 9/2014 | Suzuki | H01H 47/325 361/153 |
| 2014/0329628 A1 | | 11/2014 | Kimura et al. | |

FOREIGN PATENT DOCUMENTS

| JP | H10-019156 A | 1/1998 |
| JP | H10-340104 A | 12/1998 |
| JP | 2015-012279 A | 1/2015 |

* cited by examiner

*Primary Examiner* — Edwin A Young
(74) *Attorney, Agent, or Firm* — Posz Law Group, PLC

(57) ABSTRACT

An electronic control unit that is used in an automatic transmission to regulate oil circulation. The electronic control unit includes a switcher that supplies an electric current to a linear solenoid, a current detector that detects an actual electric current value of the solenoid, a target current calculator that calculates a target electric current value, a feedback controller that sets a duty ratio to match the actual electric current value to the target electric current value and to generate a Pulse Width Modulation (PWM) signal having the set duty ratio, and a corrector that determines whether a coupled oscillation has occurred by obtaining oil pressure information of the hydraulic circuit and to correct the PWM signal when determining that the vibration has occurred.

6 Claims, 6 Drawing Sheets

CONTROL UNIT OF AUTOMATIC TRANSMISSION

CROSS REFERENCE TO RELATED APPLICATION

The present application is based on and claims the benefit of priority of Japanese Patent Application No. 2014-226227, filed on Nov. 6, 2014, the disclosure of which is incorporated herein by reference.

TECHNICAL FIELD

The present disclosure generally relates to a control unit of an automatic transmission or, more specifically, the automatic transmission having multiple hydraulic valves in an oil circulation portion of a hydraulic circuit and at least one of those hydraulic valves being operated by a solenoid.

BACKGROUND INFORMATION

Conventionally, as disclosed in a patent document, Japanese Patent Laid-Open No. JP H10-19156 A (Patent document 1) listed below, a control unit performs a feedback control for controlling an electric current flowing in a solenoid of an electromagnetic valve.

The control unit described above includes: a switching section (i.e., a Pulse Width Modulation (PWM) circuit) on a power supply path toward the solenoid for flowing an electric current to the solenoid when being turned ON; a detector (i.e., an electric current detection circuit) for detecting an actual electric current value flowing in the solenoid; and a feedback controller (i.e., a microcomputer) for setting a duty ratio, which allows the detected actual electric current value to follow a target electric current value, and generating a PWM signal having the set duty ratio in a preset cycle for supplying the signal to the switching section.

The oil pressure valve, which is operated by the solenoid, is provided in the hydraulic circuit of the automatic transmission. Therefore, the control unit disclosed in the patent document 1 is used for the control of the automatic transmission. In recent years, the hydraulic circuit has a complicated structure, and a configuration of such structure includes two or more hydraulic valves in the oil circulation portion of the circuit, among which one or more hydraulic valves may be operated by the solenoid.

In such a configuration, a coupled oscillation may occur, which results from an oil pressure effect bouncing around between the multiple hydraulic valves. The coupled oscillation in such a configuration/structure is confirmed by the inventor of the present application. The mechanism of how coupled oscillation occurs in the hydraulic circuit is understood as follows.

The propagation rate of oil pressure affects the characteristic of the coupled oscillation such as frequency, amplitude and the like. The propagation rate is determined by the viscosity of the oil, and the viscosity of the oil changes according to the oxidization of the oil and the environmental temperature of the oil in which the oil is used. Therefore, when the viscosity of the oil changes according to the change of the environmental temperature of the oil, for example, the oscillation of the oil in the circuit may become noticeable (i.e., the oscillation exceeding an allowable level has occurred), thereby coupling the oscillation of many parts of the oil and the circuit to result in the coupled oscillation.

For example, when the hydraulic circuit has three hydraulic valves in the circulation portion, an influence of the operation of the first oil pressure valve is transmitted to the second oil pressure valve through the oil. Therefore, an input pressure of the second oil pressure valve is not stabilized, and a valve position of the second oil pressure valve is not converged (i.e., is not stabilized). Further, an influence of the operation of the second oil pressure valve is transmitted to the third oil pressure valve through the oil. Therefore, an input pressure of the third oil pressure valve is not stabilized, and a valve position of the third oil pressure valve is also not converged. Furthermore, an influence of the operation of the third oil pressure valve is transmitted to the first oil pressure valve through the oil. Therefore, an input pressure of the first oil pressure valve is not stabilized, and a valve position of the first oil pressure valve is not converged.

Thus, the coupled oscillation occurs from the coupling of the effects from each of the hydraulic valves, which is understood as causing a continuous operation of the same valve. That is, as the convergence of the valve position of each of the hydraulic valves stays unachieved for a long time (i.e., the continuous operation of the valve lingers on), and the oil pressure does not really attenuate, causing a continuation of the oscillation of the oil. In such a situation, the controllability of the automatic transmission may deteriorate.

SUMMARY

It is an object of the present disclosure to provide a control unit of the automatic transmission which is capable of controlling a deterioration of controllability due to the coupled oscillation of the oil in the hydraulic circuit.

The present disclosure is disclosed as providing the following technical features. The numerals in the parentheses of the claims are intended to show a relationship between the claim elements and the components in the embodiments, which should not be a limiting one (i.e., allowing many modifications and changes) as long as the modified/changed configuration achieves the same advantageous effects of the disclosure.

In an aspect of the present disclosure, a control unit of an automatic transmission includes a switcher that is provided on a power supply path and switching ON and OFF of a supply of a solenoid electric current flowing in the solenoid, a detector that detects an actual value of the solenoid electric current flowing in the solenoid, a microprocessor that is configured to include a feedback controller that sets a duty ratio so that the actual value of the solenoid electric current follows a target value of the solenoid electric current based on the detected actual value of the solenoid electric current and by obtaining the target value of the solenoid electric current, and that generates in a preset cycle a PWM signal with the set duty ratio to supply the PWM signal to the switcher, and a corrector that determines whether a coupled oscillation of the plurality of hydraulic valves coupled via oil in the hydraulic circuit has occurred by obtaining oil pressure information from the hydraulic circuit and correcting the PWM signal upon determining that the coupled oscillation has occurred. The corrector corrects the PWM signal to have a corrected state of the solenoid electric current, in which at least one of an amplitude and a cycle of the solenoid electric current in the corrected state is different from a non-corrected state of the solenoid electric current.

According to the above, the oil pressure in the hydraulic circuit is examined for the determination whether the coupled oscillation has occurred therein, and, when it is determined that the coupled oscillation has occurred in the hydraulic circuit, the PWM signal is corrected. By correcting the PWM signal, at least one of the amplitude and the cycle of the electric current flowing in the solenoid is changed (i.e., one of the corrected amplitude or the corrected cycle of the electric current is different from the non-corrected state of the amplitude or the cycle of the electric current). Therefore, the operation cycle of the hydraulic valve that is operated by the solenoid is intentionally disturbed or randomized. That is, a noise electric current is intentionally injected in the solenoid, for the prevention of the coupling of the oscillations of many valves at different parts of the hydraulic circuit.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment of present disclosure is described based on the drawings. Like numbers shall be given to like elements in each of the following embodiments.

First Embodiment

Figure 1:
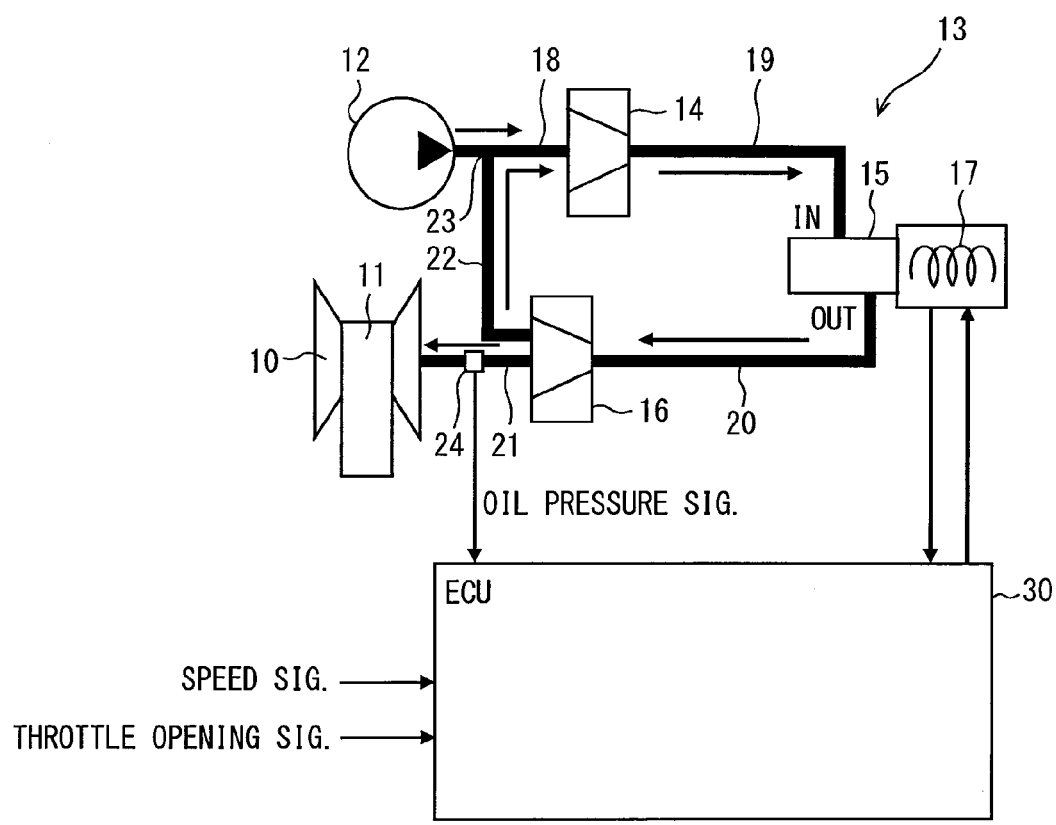
FIG. 1 is an illustration of a hydraulic circuit of an automatic transmission to which an electronic control unit concerning a first embodiment of the present disclosure is applied.

First, based on FIG. 1, an automatic transmission controlled by an electrical control unit concerning the present embodiment is described.

In the present embodiment, a Continuously-Variable Transmission (CVT) is adopted as an automatic transmission. Hereafter, the continuously-variable transmission is abbreviated to be a CVT, and more practically, the CVT in the following is a belt-type CVT.

The CVT is provided with a pulley 10 and a belt 11 as shown in FIG. 1. The illustration of a gearbox in FIG. 1 is simplified. The CVT has two belt pulleys 10 (one of which is shown), a primary pulley (i.e., an input-shaft pulley) and a secondary pulley (i.e., an output shaft pulley). A torque from the engine is conveyed to the primary pulley via a torque converter and a forward-backward travel switching mechanism (not illustrated), and is transmitted via the belt 11 to the secondary pulley, and then from the secondary pulley to tires via a speed reduction gear and the drive shaft.

The pulley 10 has two pulley pieces respectively having a slope, and one of the two pieces can slide along the axial direction. The belt 11 is bound in a position between the slopes of the two pulley pieces. When one of the two pulley pieces slides along the axis, the width of a V-groove changes, thereby changing a circle radius of the belt 11 in the V-groove. Since the length of the belt 11 is fixed, when one circle radius (e.g., on a primary pulley side) becomes large, the other circle radius on the other side will become small. The radius ratio (i.e., a ratio of radii of two pulley pieces) is a gear ratio of the automatic transmission.

An oil pressure is applied to the pulley 10. The oil pressure comes out from an oil pump 12, and is adjusted in a hydraulic circuit 13, and is the supplied and applied to the pulley 10. As described above, the belt 11 is used to transmit the torque. Therefore, the oil pressure is applied to the pulley 10 as a pressing force so that the belt 11 does not slip. Further, based on the above-described non-slipping condition, the balance between the pressing force for the primary pulley and the secondary pulley is changed for the purpose of changing the gear ratio.

A hydraulic circuit 13 is, as described above, required for controlling a slip of the belt 11 and for controlling the gear ratio. As shown in FIG. 1, the hydraulic circuit 13 is disposed at a position between the oil pump 12 and the pulley 10, and a part of the hydraulic circuit 13 is used to circulate the oil. The oil circulation part of the hydraulic circuit 13 has a first oil pressure valve 14, a second oil pressure valve 15, and a third oil pressure valve 16. In the present embodiment, the first oil pressure valve 14 and the third oil pressure valve 16 are, respectively, a value that operates by receiving a force (i.e., an oil pressure), from the oil, and the second oil pressure valve 15 is a valve that operates by receiving a force from a linear solenoid 17. The linear solenoid 17 corresponds to a solenoid.

In the valve using the linear solenoid 17, the pressing force from the spool is continuously changeable by continuously changing the electric current which flows in the coil, thereby controlling the pressing force to have an arbitrary value. The first oil pressure valve 14, the second oil pressure valve 15, and the third oil pressure valve 16 may also be simply designated as the hydraulic valves 14, 15, 16.

The original pressure of the oil discharged from the oil pump 12 is inputted to the first oil pressure valve 14 through a first oil passage 18. A "line pressure" outputted from the first oil pressure valve 14 is inputted to the second oil pressure valve 15 through a second passage 19. A "solenoid pressure" outputted from the second oil pressure valve 15 is inputted to the third oil pressure valve 16 through a third passage 20. Further, a "sheave pressure" outputted from the third oil pressure valve 16 is applied to the pulley 10 through a fourth passage 21. The surplus oil is returned to the first passage 18 through a fifth passage 22 from the third oil pressure valve 16. A numeral 23 represents a connection part between the fifth passage 22 and the first passage 18. In the following, the first passage 18, the second passage 19, the third passage 20, the fourth passage 21, and the fifth passage 22 may also be simply designated as passages 18-22. In FIG. 1, solid line arrows respectively show a flow direction of the oil in each of the passages 18-22.

The hydraulic circuit 13 has, as shown in FIG. 1, the oil circulation part provided as a downstream side of the first passage 18 relative to the connection part 23 plus the second passage 19, the third passage 20, and the fifth passage 22.

In order to detect the coupled oscillation mentioned later, an oil pressure sensor 24 is disposed in the hydraulic circuit 13. In the present embodiment, the oil pressure sensor 24 is disposed in the fourth passage 21. Although the fourth passage 21 is not the oil circulation part, since the oil pressure outputted from the third oil pressure valve 16 flows into one way passage toward the pulley 10, the coupled oscillation is detectable by the sensor 24.

However, the arrangement of the oil pressure sensor 24 is not limited to the above-mentioned position. That is, the sensor 24 may be positioned in the oil circulation part, for example. That is, the position of the sensor 24 may be arbitrarily arranged as long as the sensor 24 can detect the coupled oscillation. In other words, an upstream part of the connection part 23 in the first passage 18, or, an oil pump 12 side thereof, may be an exception for the arrangeable position of the sensor 24 among the passages 18-22. The sensor 24 may be positioned anywhere other than the above-described exception position.

Next, the coupled oscillation is described based on FIG. 1.

As shown in FIG. 1, in the present embodiment, multiple hydraulic valves 14-16 are disposed in the oil circulation part of the hydraulic circuit 13. In such configuration, the coupled oscillation caused by an oil-mediated pressure effect among the hydraulic valves is problematic. The coupled oscillation is assumed to be generated by the following mechanism.

The propagation rate (i.e., a speed of propagation) of the oil pressure affects the characteristic (e.g., frequency, amplitude, etc.) of the coupled oscillation. The propagation rate is determined by the viscosity of the oil and the viscosity changes depending on the oxidization and the environmental temperature of the oil. Therefore, when the viscosity of the oil changes (i.e., when the environmental temperature of the oil changes), the oscillation of the oil in the circuit may become noticeable (i.e., the oscillation exceeding an allowable level occurs), thereby coupling the oscillation of many parts of the oil and the circuit to result in the coupled oscillation.

In FIG. 1, the influence, or an affection, by the operation of the first oil pressure valve 14 is transmitted to the second oil pressure valve 15 via the oil in the second passage 19. Therefore, the input pressure of the second oil pressure valve 15 is not stabilized, and a valve position of the second oil pressure valve 15 is not converged (i.e., is not stabilized). Further, the influence by the operation of the second oil pressure valve 15 is transmitted to the third oil pressure valve 16 via the oil in the third passage 20. Therefore, the input pressure of the third oil pressure valve 16 is not stabilized, and a valve position of the third oil pressure valve 16 is not converged. Further, the influence by the operation of the third oil pressure valve 16 is transmitted to the first oil pressure valve 14 via the oil in the fifth passage 22 and the upstream part of the first passage 18 relative to the connection part 23. Therefore, the input pressure of the first oil pressure valve 14 is not stabilized, and a valve position of the first oil pressure valve 14 is not converged.

Thus, the coupled oscillation occurs because the influence from each of the hydraulic valves 14-16 circulates (i.e., is circulably transmitted), and the same valve thus operates continuously under such circumstance. That is, as the convergence of the valve position of each of the hydraulic valves 14-16 stays unachieved for a long time (i.e., the continuous operation of the valves lingers on), the oil pressure in an oscillating oil does not really attenuate, causing a continuous oscillation of the oil.

Figure 2:
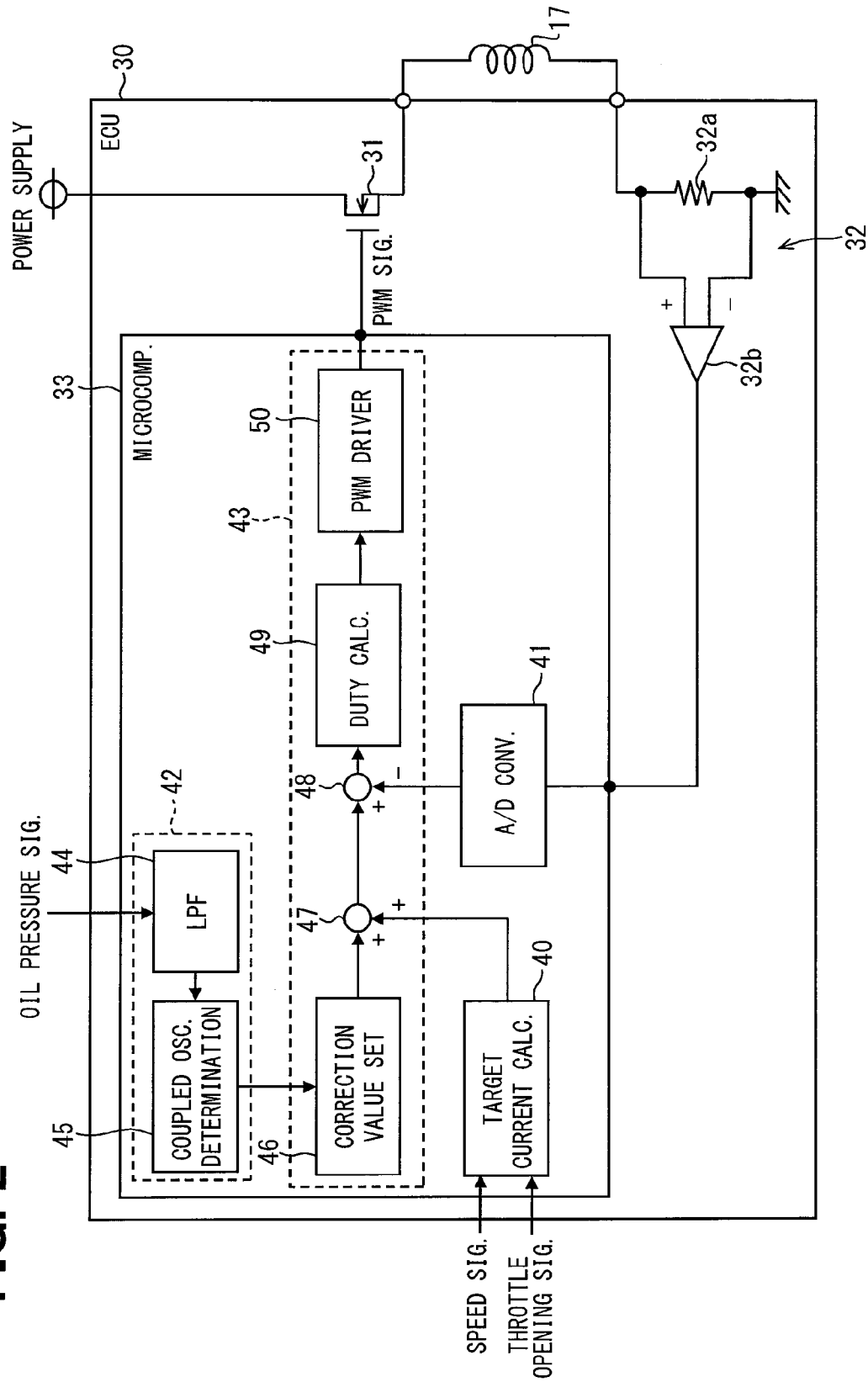
FIG. 2 is a block diagram of configuration of the electronic control unit.

Next, based on FIG. 2, the configuration of an Electronic Control Unit (ECU) 30 is described. The ECU 30 corresponds to the control device of the automatic transmission.

The ECU 30 is provided with a switch 31, a current detector 32, and a microcomputer 33 as shown in FIG. 2.

The switch 31 is provided on a power supply path of the linear solenoid 17, and ON and OFF of the switch 31 are controlled by a PWM signal supplied from the microcomputer 33. That is, the electric current is supplied to the solenoid 17 when the switch 31 is turned ON, and the electric current is intercepted from flowing to the linear solenoid 17 when the switch 31 is turned OFF.

In the present embodiment, as the switch 31, an n channel type Metal Oxide Semiconductor Field Effect Transistor (MOSFET) is adopted, and the switch 31 is disposed on a high side (i.e., in an upstream) of the linear solenoid 17. The switch 31 is turned, or switched to, ON and OFF by receiving an input of the PWM signal as a gate signal of MOSFET. The switch 31 corresponds to a switcher.

The current detector 32 has a resistor 32a for a current detection, which is connected in series to the linear solenoid 17, and an operational amplifier 32b that amplifies a voltage applied to both ends of the resistor 32a, and is outputted to the microcomputer 33. The current detector 32 corresponds to a detector.

As for the resistor 32a, one end is connected to a downstream terminal of the linear solenoid 17, and the other end is grounded. Thus, the resistor 32a is configured so that a voltage between the both terminals of the resistor 32a is proportional to the electric current (i.e., to an actual current value) that flows in the linear solenoid 17.

The operational amplifier 32b has a plus input terminal electrically connected to an upstream terminal of the resistor 32a, and a minus input terminal electrically connected to a downstream terminal of the resistor 32a. An output terminal of the operational amplifier 32b is connected to one of the input ports of the microcomputer 33. Thus, the operational amplifier 32b is configured so that a voltage between both ends of the resistor 32a is amplified and is output to the microcomputer 33.

The microcomputer 33 is a device which is provided with a Central Processing Unit (CPU), Read-Only Memory (ROM), Random Access Memory (RAM), a register, an Input/Output (I/O) port, etc., and is constituted. In the microcomputer 33, CPU performs signal processing according to a control program stored in ROM and various data that are obtained via a bus, with the help of a memory function of RAM or the register. Further, the signal obtained by such signal processing is outputted to the bus or to other devices. Thus, the microcomputer 33 performs various functions. In the present embodiment, the PWM signal mentioned later is generated, and the generated PWM signal is outputted to the gate of the switch 31.

The microcomputer 33 is provided with a target current calculator 40, an Analog/Digital (A/D) converter 41, a corrector 42, and a Feedback (F/B) controller 43 as shown in FIG. 2.

The target current value calculator 40 computes a current value that flows to the linear solenoid 17 (i.e., a target current value) in order to put the linear solenoid 17 in a target state, for controlling the linear solenoid 17 as a control object. In the present embodiment, a speed signal and a throttle opening signal are obtained from the sensor or the like, which are attached to the vehicle (not illustrated), for example. Then, a desirable gear ratio of the automatic transmission is determined based on the obtained signal, and the target current value is computed. Thus, the target current value is computed so that the oil pressure is controlled to realize a certain (e.g., desirable) gear ratio, based on the vehicle speed (i.e., the engine rotation), the throttle opening, etc.

The A/D converter 41 has an input terminal that is electrically connected to the output terminal of the operational amplifier 32b. The A/D converter 41 performs an A/D conversion that converts the input signal from the operational amplifier 32b (i.e., the actual current value), and outputs the converted signal to a deviation calculator 48 that is mentioned later.

The corrector 42 obtains an oil pressure signal from the oil pressure sensor 24, and determines whether the coupled oscillation has occurred in the hydraulic circuit 13. Further, when it is determined that the coupled oscillation has occurred, the PWM signal is corrected. More practically, for a purpose of correcting at least one of an amplitude or a cycle of the electric current flowing in the linear solenoid 17 to be put in a corrected state, which is different from a non-corrected state, the PWM signal is corrected by the corrector 42. In the present embodiment, the corrector 42 corrects the PWM signal by setting a correction pattern for correcting the target current value as mentioned later.

The corrector 42 is provided with a Low Pass Filter (LPF) 44 and a coupled vibration determination unit 45.

The LPF 44 cuts the frequency exceeding a predetermined frequency. In other words, a signal with an under-threshold frequency is passed un-cut and is outputted. In the present embodiment, among the input oil pressure signals, the frequency over 20 Hz is cut by the LPF 44, and the frequency under 20 Hz is output. In such manner, the oscillation other than the coupled oscillation is cut.

The coupled oscillation determination unit 45 compares the amplitude of the oil pressure signal that has passed the LPF 44 with a preset reference value (i.e., a reference amplitude) and, when the amplitude of the oil pressure signal exceeds the reference value, the determination unit 45 determines that the coupled oscillation has occurred. In the present embodiment, 100 kPa is set up as a reference value. Even though the frequency and the amplitude of the coupled oscillation may change according to the configuration of the automatic transmission and the margin of the preset value etc., an oscillation of the oil pressure with a frequency of under 20 Hz and an amplitude over 100 kPa is considered as the coupled oscillation.

The coupled oscillation determination unit 45 provides, in addition to the above-mentioned determination function, a setting function that sets the correction pattern that is superposed on the target current value computed by the target current calculator 40, when it is determined that the coupled oscillation has occurred. The correction pattern is stored in a correction table. The correction table stores multiple correction patterns. The correction pattern is a combination of (i) an amplitude that is to be added to the target current value and (ii) a cycle that is a period of time during which the addition of amplitude is performed.

The coupled oscillation determination unit 45 reads one correction pattern from the correction table stored in ROM, and stores the pattern in RAM, as a setting of the correction pattern. Further, when the coupled oscillation is continuously determined in series (i.e., two times or more), the correction pattern used in the second correction is different from the correction pattern in the first correction.

The electric-current the F/B controller 43 has a correction value set unit 46, an adder 47, the deviation calculator 48, a duty calculator 49, and a PWM driver 50. The correction value set unit 46 corresponds to a first set unit, and the adder 47 corresponds to a first adder.

The correction value set unit 46 obtains a correction pattern from the coupled oscillation determination unit 45, and sets an electric-current correction value (i.e., a correction value) for correcting the target current value based on the obtained correction pattern. Although the correction value may be set by calculation, in the present embodiment, the relationship between the correction pattern and the electric-current correction value is established in advance, and the electric-current correction value according to the correction pattern is read from ROM, and is set.

The adder 47 adds, to the target current value computed by the target current calculator 40, the electric-current correction value set by the correction value set unit 46. Thereby, the target current value on which the correction pattern is superposed is computed. When the correction pattern is set, the electric-current correction value is added to the target current value. When the correction pattern is not set, the electric-current correction value is not set, thereby the target current value outputted from the adder 47 is not the corrected one. In the following, the target current value after the correction is designated as an after-correction target current value, and the target current value before the correction is simply designated as a target current value.

The deviation calculator 48 computes a deviation (i.e., an electric current deviation) of the target current value outputted from the adder 47 from the actual current value inputted from the A/D converter 41. When the electric-current correction value is added, the deviation is computed as the one between the after-correction target current value and the actual current value. The deviation calculator 48 outputs the computed deviation to the duty calculator 49.

Based on the computed deviation, the duty calculator 49 computes a duty ratio of the PWM signal for performing a F/B control of the linear solenoid 17 so that the actual current value follows the target current value. The cycle is stored in RAM together with the computed duty ratio. When the cycle is changed by the corrector 42, the cycle is also stored in RAM.

The PWM driver 50 has a register for storing data which defines the PWM signal. The duty ratio and the cycle which are computed by the duty calculator 49 are stored in the register. The PWM driver 50 generates a pulse signal according to the duty ratio and the cycle which are stored in the register (i.e., the driver 50 generates a PWM signal).

In the present embodiment, the target current calculator 40, the A/D converter 41, the corrector 42 including the LPF 44 and the coupled oscillation determination unit 45, and the electric-current F/B controller 43 including the correction value set unit 46, the adder 47, the deviation calculator 48, the duty calculator 49, and the PWM driver 50 are respectively realized as a functional block of the microcomputer 33 (i.e., respectively as functions instructed by software and implemented by the microcomputer 33 and other hardware components).

Figure 3:
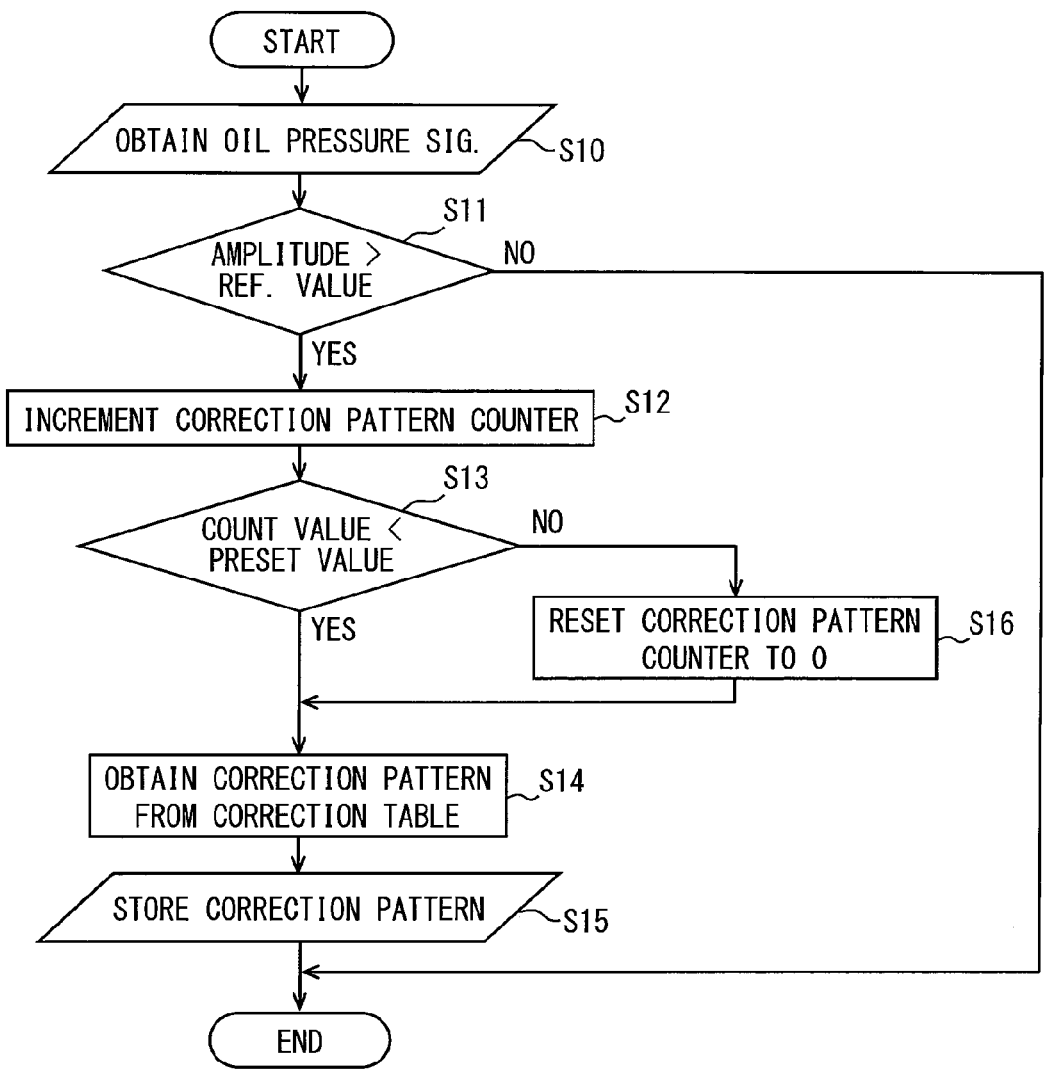
FIG. 3 is a flowchart of a process performed by a corrector.

Next, a process performed by the corrector 42 is described based on FIG. 3. During a period when the power supply of ECU 30 is switched ON, the corrector 42 repeatedly performs a series of processes (i.e., steps) shown in FIG. 3.

As shown in FIG. 3, the corrector 42 obtains the oil pressure signal from the oil pressure sensor 24 first (Step S10). Any signal may serve as the oil pressure signal as long as the signal represents the oil pressure of an oscillatable portion of the oil, since the oil pressure signal is obtained in order to detect whether the coupled oscillation has occurred in the hydraulic circuit 13. In the present embodiment, the oil pressure of the fourth passage 21 is detected so that a sheave pressure is detected, and the detected pressure is inputted to the corrector 42 as the oil pressure signal. The oil pressure signal corresponds to oil pressure information.

As described above, the corrector 42 has the LPF 44, which cuts a frequency component exceeding the threshold frequency (20 Hz) in the obtained oil pressure signal. That is, high frequency oscillation (i.e., a noise) that is higher than the frequency of the coupled oscillation is cut. The signal which has passed the LPF 44 is inputted to the coupled oscillation determination unit 45. The coupled oscillation determination unit 45 of the corrector 42 compares the amplitude of the passing signal with the reference value (i.e., 100 kPa), and determines whether the amplitude is larger than the reference value (Step S11). In Step S11, when it is determined that the amplitude is smaller the reference value (i.e., when it is determined that the coupled oscillation has not occurred), the process is finished.

On the other hand, in Step S11, when it is determined that the amplitude is greater than the reference value (i.e., when it is determined that the coupled oscillation has occurred), the coupled oscillation determination unit 45 increments a count value of a correction pattern counter, (not illustrated) (Step S12). Then, it is determined whether a count value after increment (i.e., after an addition of 1) is smaller than a specific threshold value that is set up in advance (i.e., a preset value) (Step S13). Here, the specific threshold value is set according to the number of correction patterns stored in the correction table. That is, in Step S13, it is determined whether the count value exceeds the stored number of correction patterns.

In Step S13, when it is determined that the count value is smaller than the specific threshold value, the coupled oscillation determination unit 45 obtains the correction pattern from the correction table (Step S14). Each of the correction patterns stored in the correction table has an index number, and the index number corresponds to the count value of the correction pattern counter. Therefore, the coupled oscillation determination unit 45 obtains the correction pattern having an index number corresponding to the count value. Then, the correction pattern is set by storing the obtained correction pattern in RAM (Step S15), and a series of processes are finished.

In the present embodiment, a total of eight correction patterns are stored in the correction table, which is the number of combinations of the cycle and the amplitude. That is, eight correction patterns are derived by the product of two cycles and four amplitudes. The coupled oscillation determination unit 45 sets, or applies, one of eight correction patterns one by one after a determination of the coupled oscillation until the amplitude is decreased to (i.e., is equal to or smaller than) the reference value of the coupled oscillation. That is, the different correction pattern is set and used (one by one) until the coupled oscillation is diminished.

On the other hand, in Step S13, when it is determined that the count value is greater than the specific threshold value, the coupled oscillation determination unit 45 sets the count value of the correction pattern counter to 0 (zero) (Step S16). That is, the count value is reset. Then, the processes in the above-mentioned step S14 and S15 are performed.

Figure 4:
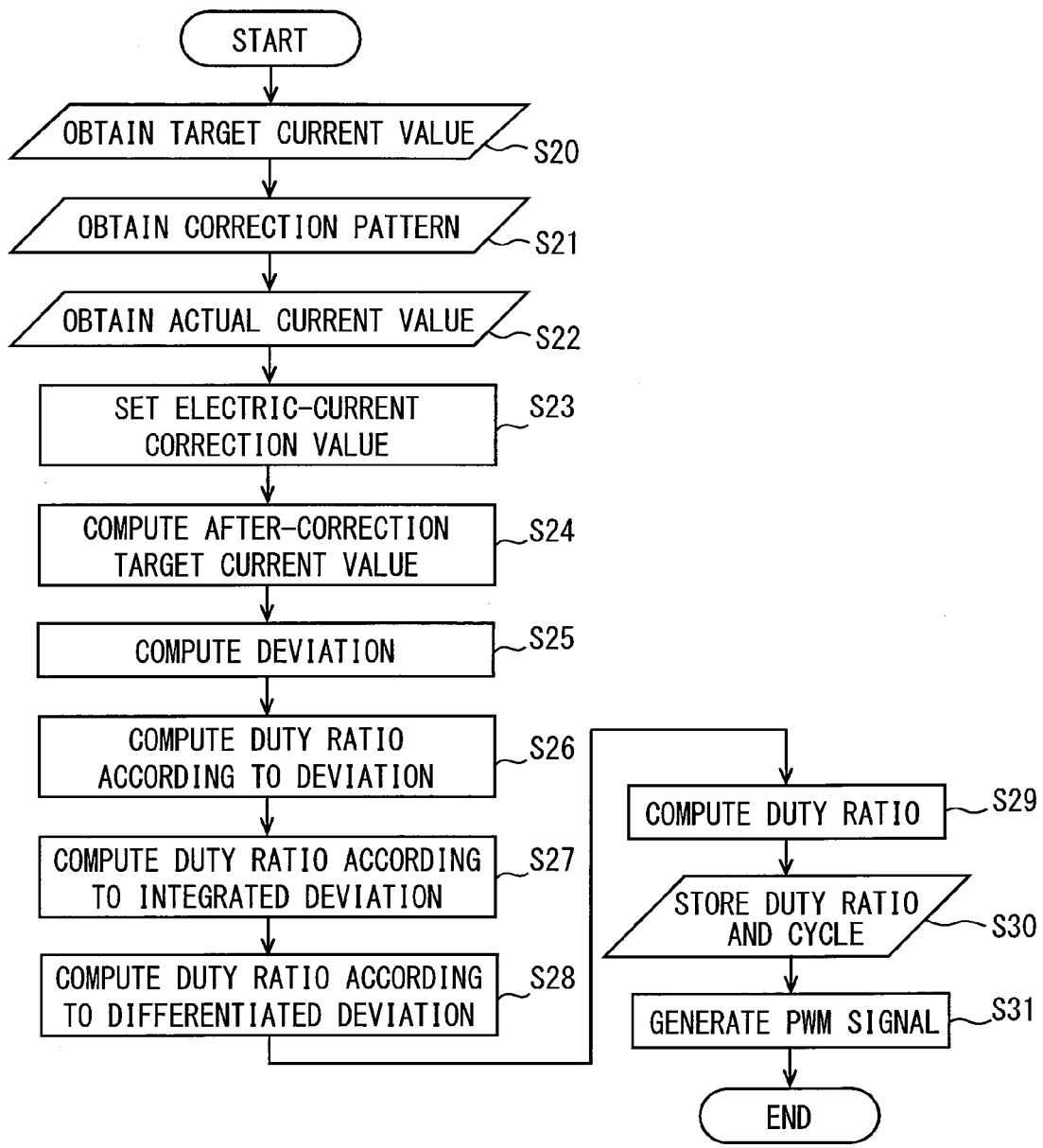
FIG. 4 is a flowchart of a process performed by a feedback controller.

Next, based on FIG. 4, a process performed by the electric-current F/B controller 43 is described. During the period when the power supply of ECU 30 is switched ON, the electric-current F/B controller 43 repeatedly performs a series of processes shown in FIG. 4.

The electric-current the F/B controller 43 obtains the target current value computed by the target current calculator 40 (Step S20). The electric-current the F/B controller 43 obtains the correction pattern from the corrector 42 (Step S21). The electric-current the F/B controller 43 obtains the actual current value from the A/D converter 41 (Step S22).

Next, the correction value set unit 46 sets the electric-current correction value for correcting the target current value based on the obtained correction pattern (Step S23). In the present embodiment, the relationship between the correction pattern and the electric-current correction value is set in advance, and the electric-current correction value according to the correction pattern is read from the memory and is set. The correction pattern is a combination of the amplitude to be added to the target current value and the cycle which is a period during which the addition of amplitude is performed. For example, when an amplitude 0.1 A and a cycle of 6.6 ms are set as a correction pattern, the electric-current correction value is set so that +0.05 A is added three times in a row by a cycle of 1.1 ms and then −0.05 A is added three times in a row by a cycle of 1.1 ms. The cycle of 1.1 ms described above is a cycle of one pulse of the PWM signal.

Thus, in the present embodiment, the electric-current correction value is set so that (i) the first half of the cycle that is set in the correction pattern uses a half value of the amplitude in the correction pattern for the addition to the target current value and (ii) the second half of the cycle that is set in the correction pattern uses a half value of the amplitude in the correction pattern for the subtraction from the target current value.

Next, the adder 47 adds the electric-current correction value to the obtained target current value, and computes the after-correction target current value (Step S24). Then, the deviation calculator 48 computes the deviation (i.e., an electric current deviation) based on the after-correction target current value and the actual current value (Step S25).

When the deviation is computed, the duty calculator 49 performs a calculation of the duty ratio that is proportional to the deviation (Step S26), and a calculation of the duty ratio that is proportional to an integral value of the deviation (Step S27), and a calculation of the duty ratio that is proportional to a differential value of the deviation (Step S28). The duty calculator 49 computes a sum of the three duty ratios computed in Steps S26-S28 as a duty ratio outputted to the PWM driver 50 (Step S29). Thus, in the present embodiment, a Proportional-Integral Derivative (PID) control of the electric current that flows to the linear solenoid 17 is performed.

Next, the duty ratio and the cycle computed by the duty calculator 49 are stored in RAM (Step S30), and are outputted to the PWM driver 50. In RAM, a predetermined duty ratio and a predetermined cycle are stored respectively as an initial value for the ratio and the cycle. In other words, the electric current, the amplitude, and the cycle are stored as an initial value of the electric current that is supplied to the linear solenoid 17. When the duty ratio is computed by the duty calculator 49, the computed duty ratio is then saved in RAM. Further, when the cycle of the set-up correction pattern differs from the initial value, the set-up cycle is saved in RAM. When there is no input from the target current calculator 40 and the corrector 42, the value stored in RAM, (i.e., the value used in the last setting is outputted to the PWM driver 50).

The duty ratio and the cycle outputted to the PWM driver 50 are saved in the register of the PWM driver 50. The PWM driver 50 generates a pulse signal according to the duty ratio and the cycle stored in the register (i.e., the PWM driver 50 generates a PWM signal) (Step S31). A series of processes are then finished after the above.

A timing for obtaining the actual current value is not limited to the above-mentioned example. The actual current value may be obtained after the electric-current correction value setup. Further, the actual current value may be obtained before obtaining the target current value and before obtaining the correction pattern. An order of obtaining the target current value and obtaining the correction pattern may be reversed.

Next, the operational effects of the ECU 30 (i.e., a control device of the automatic transmission) are described.

Figure 5:
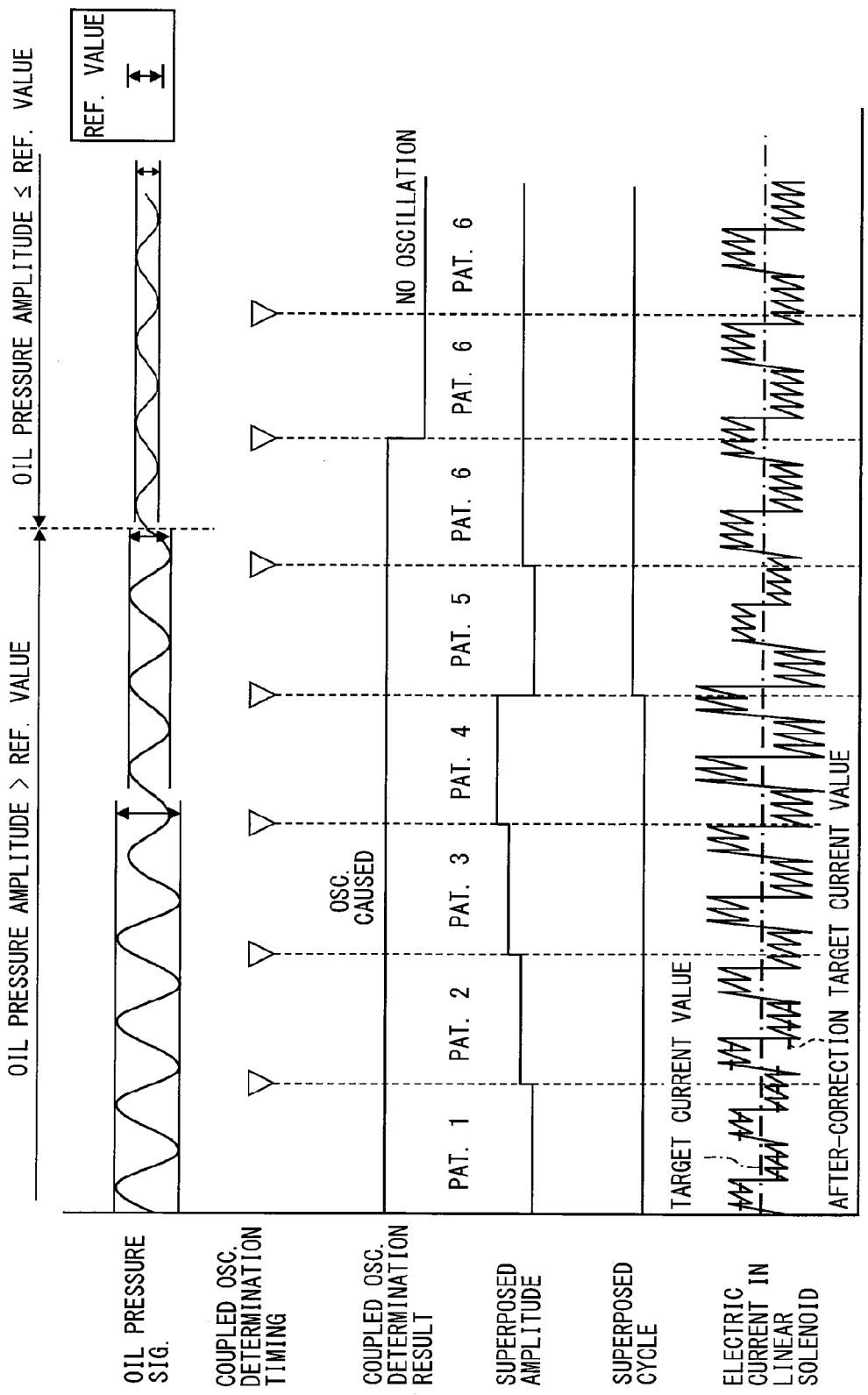
FIG. 5 is a timing chart regarding a control of the electronic control unit.

The ECU 30 of the present embodiment is provided with the corrector 42. The corrector 42 is capable of determining whether the coupled oscillation has occurred based on the oil pressure signal. Further, the corrector 42 is capable of setting the correction pattern when it is determined that the coupled oscillation has occurred. The correction pattern has the amplitude and the cycle for correcting the target current value. When the correction pattern is set, the electric-current F/B controller 43 is capable of setting the electric-current correction value based on the correction pattern. Thus, the after-correction target current value represented by a broken line in FIG. 5 is computed by adding the electric-current correction value to the target current value represented by a dotted chain line in FIG. 5.

Therefore, for the purpose of correcting the target current value, at least one of the amplitude and the cycle of the electric current flowing in the solenoid (i.e., the actual current value) is changed to the one that is different from a non-corrected state. In other words, for intentionally disturbing the operation cycle of the second oil pressure valve 15, which is operated by the linear solenoid 17, the circulation of the influences from each of the hydraulic valves 14-16 is interrupted, thereby preventing the coupling of the oscillations from those valves. Therefore, the deterioration of the controllability due to the coupled oscillation is prevented.

In the present embodiment, the ECU 30 is applied to a belt type CVT. When the automatic transmission is a CVT, for the purpose of preventing the slip of the belt 11, the pulley 10 needs to have a pressing force applied thereto. Therefore, the oil pressure in the CVT needs to be higher than the one in other automatic transmissions, thereby making the CVT to be prone to the coupled oscillation. However, the coupled oscillation is controllable and preventable according to the above-mentioned scheme of the ECU 30, which makes the CVT more versatile and usable under control of the ECU 30.

In the present embodiment, the corrector 42 has the LPF 44. In view of a situation that the coupled oscillation tends to be caused in a frequency of 5 to 20 Hz, the filtering of a high frequency component (i.e., the noise) 44 higher than a 5 to 20 Hz frequency range by the LPF makes it easier for the ECU 30 to more accurately detect the coupled oscillation. That is, the noise component is efficiently removed by the LPF 44.

In the present embodiment, a different correction pattern is used and applied to the coupled oscillation (one by one) until there is a no oscillation determination, as long as the coupled oscillation is detected. That is, in an order of index numbers, the different correction patterns are exhaustively used (i.e., set and applied, one by one) for resolving the coupled oscillation. Therefore, even when the coupled oscillation is not resolved by a correction pattern used in a first attempt, the coupled oscillation is ultimately controllable after many attempts in which different correction patterns are used one by one.

FIG. 5 shows an example of such control.

In the present embodiment, eight correction patterns are stored in the correction table. The eight correction patterns are produced by the product of two cycles and four amplitudes. The correction patterns 1-4 has a cycle T1, and the correction patterns 5-8 has a cycle T2 (>T1). Further, the size of amplitude is configured in an ascending order of the correction pattern 1 (=the correction pattern 5)<the correction pattern 2 (=the correction pattern 6)<the correction pattern 3 (=the correction pattern 7)<correction pattern 4 (=the correction pattern 8). Further, the index number is given according to the number of the correction pattern. In FIG. 5, the correction pattern is designated as a pattern X (X=1 to 6).

As shown in FIG. 5, the correction patterns 1-4 with the cycle T1 are set one by one in order first. Every time the correction pattern is changed, the amplitude of the after-correction target current value becomes large step by step, and the amplitude of the electric current that flows into the linear solenoid 17 in connection with the change of the amplitude also becomes large step by step.

For example, when the correction pattern 1 has an amplitude 0.1 A and a cycle 6.6 as described above, the electric-current correction value is set so that +0.05 A is added three times in a row by a cycle 1.1 ms, and then −0.05 A is added three times in a row by a cycle of 1.1 ms. Therefore, one cycle of the electric current flowing in the linear solenoid 17 includes six pulses. The same applies to the correction patterns 2-4, thereby also including six pulses in one cycle of the electric current which flows in the linear solenoid 17.

As shown in FIG. 5, up to the correction pattern 3, no substantial effect is observed, and the application of the correction pattern 4 reduces the amplitude of the oil pressure signal slightly, leaving the amplitude to still exceed the reference value. Thus, the pattern setting is kept on going with the correction patterns 5-8 with the cycle T2. Since the cycle T2 is longer than the cycle T1, as seen in FIG. 5, the eight pulses are included in one cycle of the electric current which flows in the linear solenoid 17.

The use of the correction pattern 5 makes no change from the correction pattern 4, and then the use of the correction pattern 6 finally leads to the reduction of the amplitude falling under the reference value. That is, the oil pressure is controlled to be in a state in which no coupled oscillation has occurred. As clearly seen in the above, whenever it is determined that the coupled oscillation has occurred, a different correction pattern is set and used one by one for ultimately controlling the oscillation. After the resolution of the coupled oscillation, the correction pattern 6 which resolved the oscillation is continuously set and used. In case that a coupled oscillation is detected again, according to the index number, the correction pattern is set starting from the correction pattern 1.

Second Embodiment

In the second embodiment, the focus of the description is put on a difference from the first embodiment, thereby omitting the same configuration of the ECU 30 as the first embodiment from the following description.

In the first embodiment, when it is determined that the coupled oscillation has occurred, the electric-current correction value is set based on the correction pattern, and the correction value is added to the target current value, for the purpose of changing at least one of the amplitude and the cycle of the electric current in the linear solenoid 17.

On the other hand, in the present embodiment, when it is determined that the coupled oscillation has occurred, the duty correction value is set based on the correction pattern, and the duty correction value is added to the duty ratio, for the purpose of changing at least one of the amplitude and the cycle of the electric current in the linear solenoid 17

Figure 6:
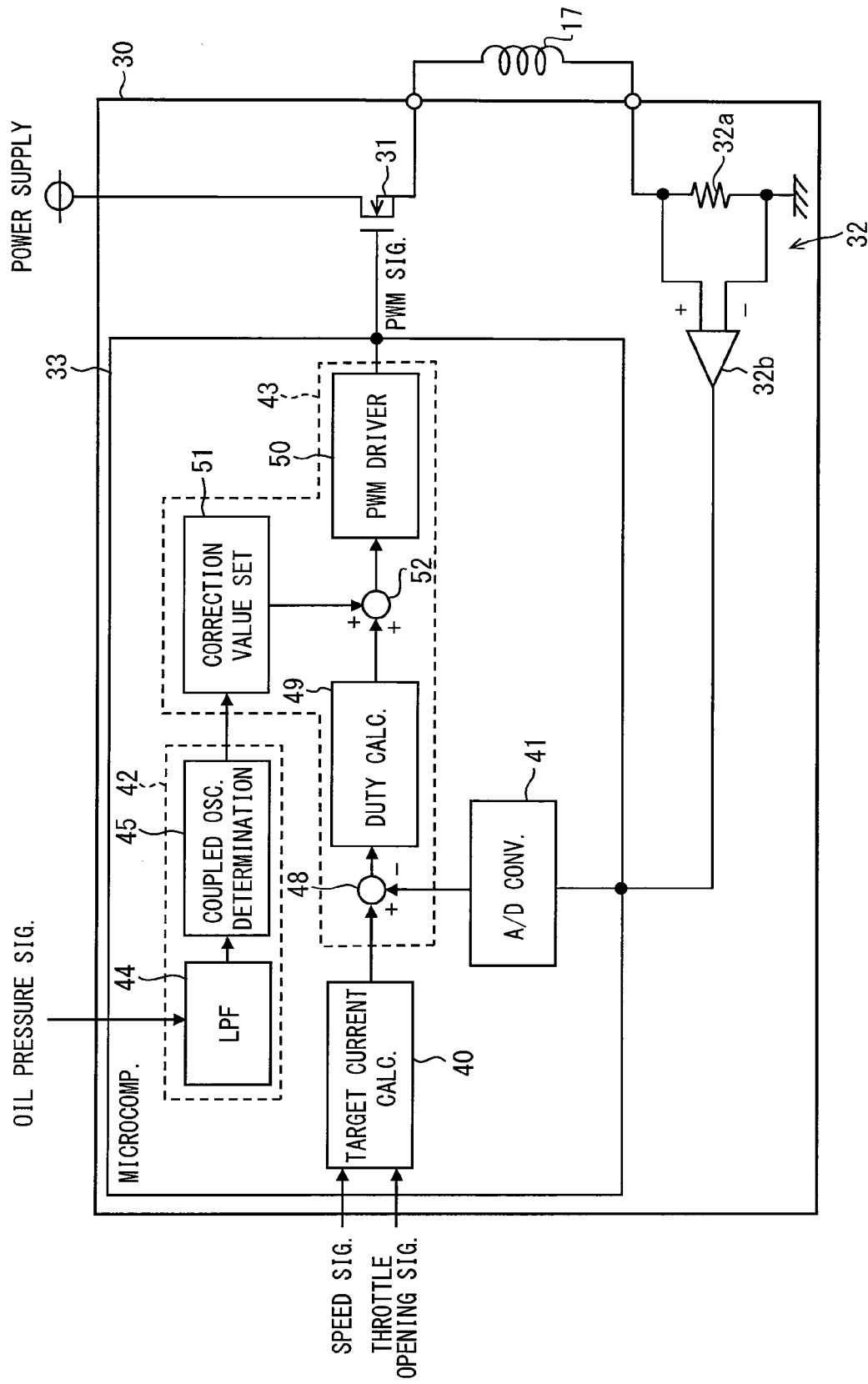
FIG. 6 is a block diagram of configuration of the electronic control unit in a second embodiment of the present disclosure.

As shown in FIG. 6, the ECU 30 does not have the correction value set unit 46 and the adder 47 in the electric-current F/B controller 43. Instead, the ECU 30 has a correction value set unit 51 and an adder 52.

The correction value set unit 51 corresponds to a second set unit, and the adder 52 corresponds to a second adder.

The deviation calculator 48 computes a deviation (i.e., an electric current deviation) of the target current value that is computed by the target current calculator 40 and the actual current value inputted from the A/D converter 41.

Based on the computed deviation, the duty calculator 49 computes the duty ratio of the PWM signal for performing a F/B control of the linear solenoid 17 so that the actual current value follows the target current value.

The correction value set unit 51 obtains a correction pattern, which is a combination of the amplitude and the cycle, which is a period of adding the amplitude from the coupled oscillation determination unit 45, and sets the duty correction value (i.e., a correction value) for correcting the duty ratio that is computed by the duty calculator 49 based on the obtained correction pattern. The duty correction value includes, just like the above-mentioned electric-current correction value, information regarding a cycle.

For example, the correction pattern is stored in the correction table as in the first embodiment. The correction table stores multiple correction patterns. The correction pattern is a combination of (i) a duty ratio that is to be added to the duty ratio that is computed by the duty calculator 49 and (ii) a cycle during which the addition of the duty ratio is performed. Each of the correction pattern stored in the correction table has a unique index number, which corresponds to the count value of the correction pattern counter, and the coupled oscillation determination unit 45 obtains a correction pattern having an index number corresponding to the count value. Further, the coupled oscillation is determined two times or more in a row, the correction pattern set and used is changed to a different one from the correction pattern used in the prior correction. Then, the obtained correction pattern is stored in RAM, which sets the correction pattern for use in the correction.

Although the correction value set unit 51 may set the duty correction value by calculation, the relationship between the correction pattern and the duty correction value in the present embodiment is set in advance, and the duty correction value according to the correction pattern is read from the memory and is set. Such a setting of the duty correction value is the same as the first embodiment.

The adder unit 52 adds the duty correction value set by the correction value set unit 51 to the duty ratio computed by the duty calculator 49. Thereby, the duty ratio is computed as a superposition of two or more correction patterns.

The PWM driver 50 has a register for the storage of data that defines a PWM signal. The duty ratio and the cycle after the correction, which is performed by the adder 52, are stored in such register. The PWM driver 50 generates a pulse signal according to the duty ratio and the cycle stored in the register (i.e., the PWM driver 50 generates a PWM signal).

Even in such configuration, the same effect as the first embodiment is achieved. Further, in the present embodiment, the target current calculator 40, the A/D converter 41, the corrector 42 including the LPF 44 and the coupled oscillation determination unit 45, and the electric-current F/B controller 43 including the deviation calculator 48, the duty calculator 49, the PWM driver 50, the correction value set unit 51, and the adder 52 are respectively realized as a functional block of the microcomputer 33 (i.e., respectively as functions instructed by software and implemented by the microcomputer 33 and other hardware components).

Although the present disclosure has been described in connection with preferred embodiment thereof with reference to the accompanying drawings, it is to be noted that various changes and modifications will become apparent to those skilled in the art.

Although an automatic transmission of the above-described embodiments is described as a CVT, a stepwise automatic transmission (AT) having, two, three or more gear ratios may also be a control subject of the ECU 30 described above.

In such case, the linear solenoid 17 is used to control an engagement and a release of the clutch that are achieved by the oil pressure, thereby controlling the AT to have a desired gear ratio (i.e., to be put in a desired step of gears).

The ECU 30 may have the oil pressure sensor 24 as a part of itself.

Although a solenoid is described as the linear solenoid 17 in the above, other solenoid type may also be usable in the above-mentioned embodiments.

In the first embodiment, the target current calculator 40, the A/D converter 41, the corrector 42 including the LPF 44 and the coupled oscillation determination unit 45, and the electric-current F/B controller 43 including the correction value set unit 46, the adder 47, the deviation calculator 48, the duty calculator 49, and the PWM driver 50 are described as respectively being realized as a functional block of the microcomputer 33 (i.e., respectively as functions instructed by software and implemented by the microcomputer 33 and other hardware components.

However, other components other than the target current calculator 40 and the coupled oscillation determination unit 45 may be respectively provided as a hardware component.

Similarly, in the second embodiment, other components other than the target current calculator 40 and the coupled oscillation determination unit 45 may be respectively provided as a hardware component.

For example, the electric-current F/B controller 43 may be entirely provided as a hardware component.

Although a feedback control of the electric current in the linear solenoid 17 is described as a PID control, other feedback control may also be useable. For example, the feedback control may be applicable to a Proportional Integral (PI) control.

Although correction by using multiple correction patterns is described in the above, the correction may be configured to have only one correction pattern.

Although the electric-current F/B controller 43 is described as including the correction value set units 46 and 51, the correction value set units 46 and 51 may be included in the corrector 42.

Such changes, modifications, and summarized schemes are to be understood as being within the scope of the present disclosure as defined by appended claims.

What is claimed is:

1. A control unit of an automatic transmission that has a hydraulic circuit in which at least one of a plurality of hydraulic valves disposed in an oil circulation part of the hydraulic circuit is operated by a solenoid, the control unit comprising:
   a switcher provided on a power supply path and switching ON and OFF of a supply of a solenoid electric current flowing in the solenoid;
   a detector detecting an actual value of the solenoid electric current flowing in the solenoid;
   a microprocessor, the microprocessor configured to include
   a feedback controller setting a duty ratio so that the actual value of the solenoid electric current follows a target value of the solenoid electric current, based on the detected actual value of the solenoid electric current, and by obtaining the target value of the solenoid electric current, and generating in a preset cycle a (Pulse Width Modulation) PWM signal with the set duty ratio to supply the PWM signal to the switcher; and a corrector determining whether a coupled oscillation of the plurality of hydraulic valves coupled via oil in the hydraulic circuit has occurred by obtaining oil pressure information from the hydraulic circuit and correcting the PWM signal upon determining that the coupled oscillation has occurred, wherein the corrector corrects the PWM signal to have a corrected state of the solenoid electric current, in which at least one of an amplitude and a cycle of the solenoid electric current in the corrected state is different from a non-corrected state of the solenoid electric current.

2. The control unit of an automatic transmission of claim 1 further comprising:

a low-pass filter provided in the corrector and filtering an oil pressure signal having a frequency of higher than a preset value, wherein the corrector determines that the coupled oscillation has occurred when the amplitude of the oil pressure signal passing through the low-pass filter exceeds a preset reference value.

3. The control unit of an automatic transmission of claim 1, wherein the corrector corrects the PWM signal by setting a different correction pattern, upon having an oscillation-caused determination that the coupled oscillation has occurred, until there is a no-oscillation determination that the coupled oscillation is resolved, and the corrector sets a different combination of the amplitude and the cycle is set as a correction pattern for the correction of the PWM signal to attempt resolving the coupled oscillation at each of the oscillation-caused determinations.

4. The control unit of an automatic transmission of claim 3, wherein the corrector sets a correction pattern that is superposed on the target value of the solenoid electric current, the feedback controller includes:

a first set unit setting a correction value that corrects the target value of the solenoid electric current based on the correction pattern; and a first adder adding the correction value to the target value of the solenoid electric current and calculating an after-correction target value of the solenoid electric current, the after-correction target value of the solenoid electric current having at least one of an amplitude and a cycle different from the non-corrected state of the solenoid electric current, and the feedback controller generates the PWM signal based on the after-correction target value of the solenoid electric current.

5. The control unit of an automatic transmission of claim 3, wherein the corrector sets the correction pattern that is superposed on the duty ratio, the feedback controller includes:

a duty calculator calculating the duty ratio based on a difference between the actual value and the target value of the solenoid electric current;

a second set unit setting a correction value for correcting the duty ratio based on the correction pattern; and a second adder adding the correction value to the duty ratio and calculating the corrected duty ratio, and the feedback controller generates the PWM signal based on the corrected duty ratio.

6. The control unit of an automatic transmission of claim 1, wherein the control unit is applicable to a continuously-variable transmission that serves as the automatic transmission.

* * * * *